(No Model.)

G. C. BRITTON.
BREAD PAN.

No. 464,420. Patented Dec. 1, 1891.

WITNESSES:
Paul Jobst
C. Sedgwick

INVENTOR
G. C. Britton
BY Munn & Co.
ATTORNEYS.

UNITED STATES PATENT OFFICE.

GABRIEL C. BRITTON, OF BOONTON, NEW JERSEY.

BREAD-PAN.

SPECIFICATION forming part of Letters Patent No. 464,420, dated December 1, 1891.

Application filed June 9, 1891. Serial No. 395,618. (No model.)

*To all whom it may concern:*

Be it known that I, GABRIEL C. BRITTON, of Boonton, in the county of Morris and State of New Jersey, have invented a new and Improved Bread-Pan, of which the following is a full, clear, and exact description.

My invention relates to improvements in bread-pans, and especially to that variety of pans which are adapted to hold a series of loaves, and which are especially intended for baking what is known as the "New England loaf."

The object of my invention is to produce a simple form of bread-pan which will allow the heat to strike directly upon all parts of each loaf, thereby giving a good crust to the loaves and making them of much better flavor than when they are not exposed so directly to the action of the heat.

To this end my invention consists in a bread-pan constructed substantially as hereinafter described and claimed.

Reference is to be had to the accompanying drawings, forming a part of this specification, in which similar figures of reference indicate corresponding parts in all the views.

Figure 1:
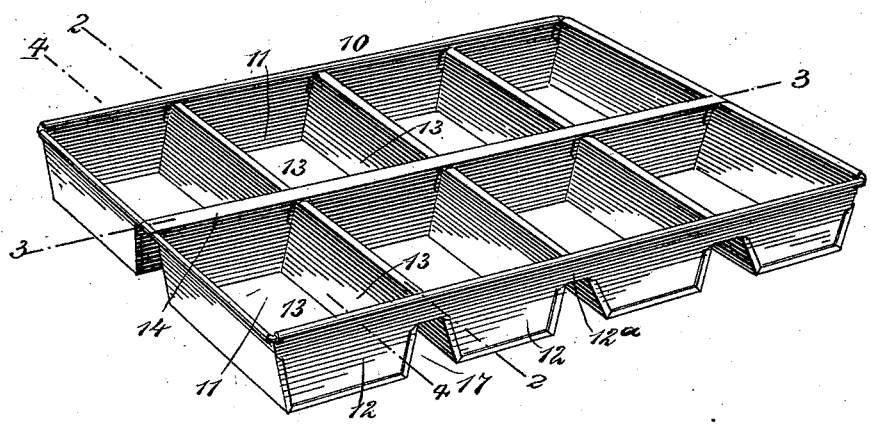
Figure 2:
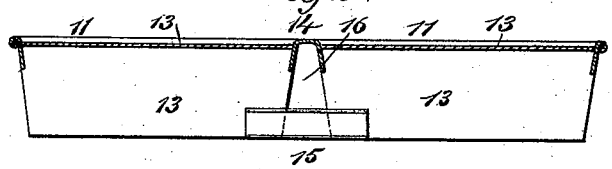
Figure 3:
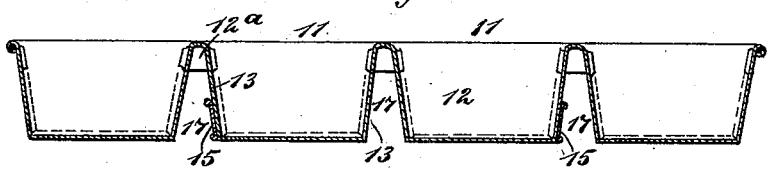
Figure 4:
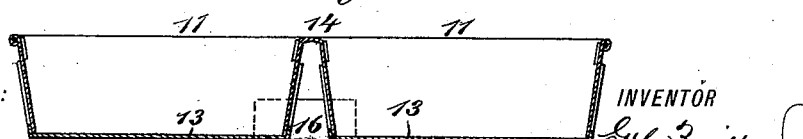

Figure 1 is a perspective view of the bread-pan embodying my invention. Fig. 2 is a cross-section of the same on the line 2 2 in Fig. 1. Fig. 3 is a longitudinal section on the line 3 3 in Fig. 1, and Fig. 4 is a cross-section on the line 4 4 in Fig. 1.

The bread-pan 10 is made up of two connected series of pans 11, but a greater or less number of series may be connected, if desired. These pans 11 have their outer ends 12 formed of a single piece. The bottom and sides 13 are also formed of a single piece, and the central partition 14, which forms the inner ends of the pans and the strip which connects the two series, is also formed of a single piece. This makes the complete pan of very simple construction and to increase its strength the end piece 12 of the pan is allowed to overlap the intervening space between them, as shown at $12^a$, and the upper edge of the complete pan is provided with a binding-wire in the usual way. To further stiffen the pan, connecting-strips 15 are soldered or otherwise fastened to opposite pans, as shown in Fig. 2, the strips being attached near the bottom, so as to prevent the two series of pans from being folded together.

It will be noticed that each pan 11 is separated from its neighbor in the same series by an intervening air-space 17, and the series of pans are separated by a longitudinal air-space 16. It will thus be seen that each individual pan is completely isolated, so that the heat may strike it upon all sides.

Having thus described my invention, I claim as new and desire to secure by Letters Patent—

1. A baking-pan comprising a series of connected pans, the bottoms and longitudinal sides of the pans being formed from a single strip and the ends of the pans being formed in a series from single strips 12, the several ends being connected, as at $12^a$, substantially as set forth.

2. A baking-pan comprising two parallel series of connected pans, the bottoms and longitudinal sides 13 of the pans of each series being formed from a single strip, the outer ends of each series of pans being formed in a connected series from a single strip 12, the several ends being connected, as at $12^a$, and the central partition 14 comprising two series of ends formed from a single piece and closing the abutting ends of the two series of pans, the pans being separated by spaces 16 17, substantially as set forth.

GABRIEL C. BRITTON.

Witnesses:
AARON H. BURRELL,
WILLARD CONKLIN.